United States Patent

[11] 3,556,260

[72] Inventor Wilhelm Meyer
 3 Kleinbahnhofstrasse, Vlotho(Weser), Germany
[21] Appl. No. 778,468
[22] Filed Nov. 25, 1968
[45] Patented Jan. 19, 1971
[32] Priority Nov. 24, 1967
[33] Germany
[31] 1,605,755

[54] BRAKE DEVICE FOR THE WHEEL OF A CONVEYANCE
 5 Claims, 6 Drawing Figs.
[52] U.S. Cl. .................................................. 188/74, 188/2, 188/82.7; 192/79
[51] Int. Cl. ...................................................... F16d 63/00
[50] Field of Search............................................ 188/74, 29, 2F, 82.7; 192/79

[56] References Cited
UNITED STATES PATENTS

| | | | |
|---|---|---|---|
| 2,738,034 | 3/1956 | Levine | 188/74X |
| 2,980,944 | 4/1961 | Bolinger | 188/74X |
| 3,117,653 | 1/1964 | Altherr | 188/74X |

Primary Examiner—George E. A. Halvosa
Attorney—Richard G. Stephens

ABSTRACT: A brake device for the wheel of a conveyance, wherein the brake device is provided with a brakeshoe movable at its upper end about a fixed bearing point and a lever linkage connected to the lower end thereof, the lever linkage having a manual operating handle and being formed as a toggle such that the brakeshoe is maintained in either an operative or an inoperative position as the toggle is moved from one side to the other.

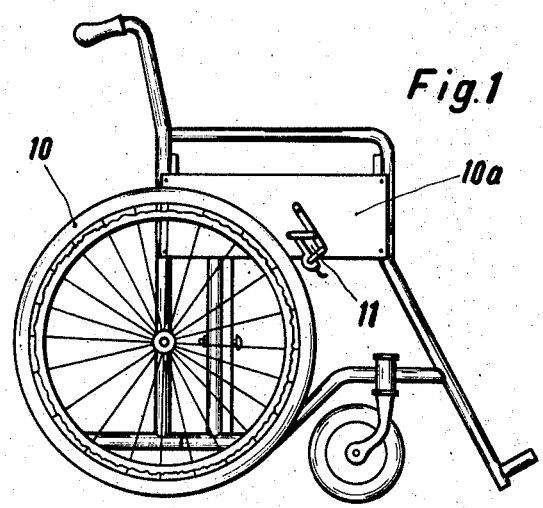
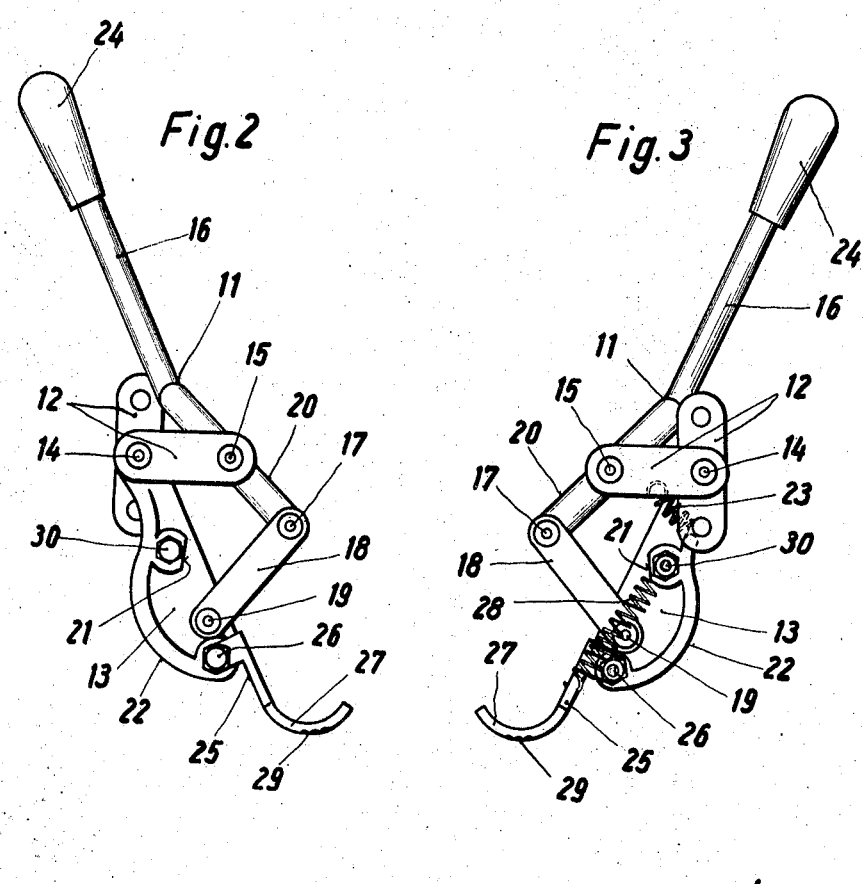

Inventor:
Wilhelm Meyer

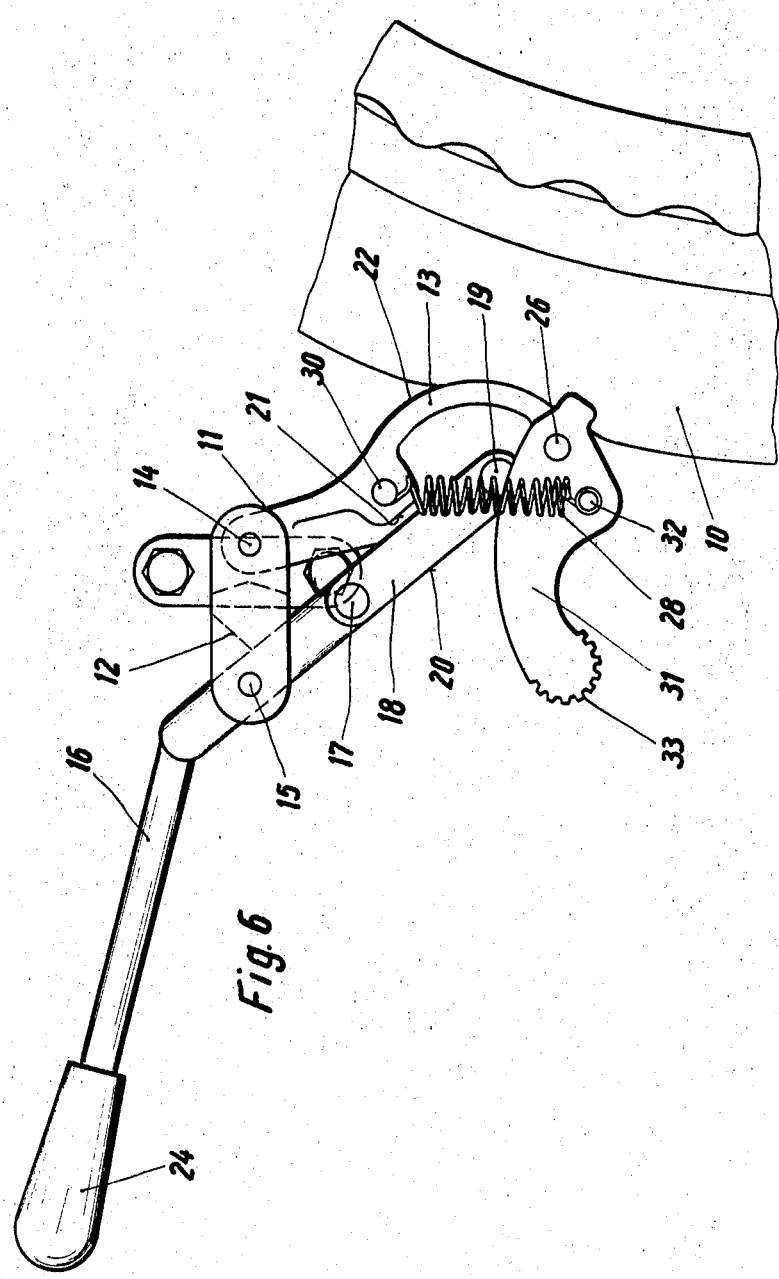

BRAKE DEVICE FOR THE WHEEL OF A CONVEYANCE

Prior Application: In Federal Republic of Germany, on 24th Nov. 1967 No. M 76353 II/63i.

The invention relates to a brake device arranged in the region of a wheel of a conveyance such as a wheelchair for invalids.

Hitherto known wheelchairs have brake devices which are formed by a brake lever pivotal about an axis, which is adapted to move a brake surface against the tread surface of the associated wheel. Such braking devices may be inadequate, since they have only a small brake surface and cannot be locked on. Furthermore these braking devices are unfavorable in their handling and prone to breakdown on actuation.

It is an object of the invention to provide a wheelchair brake which, whilst avoiding hitherto disadvantages, is of simple structure, reliable in action and readily manipulated.

According to the present invention there is provided a brake device for the wheel of a conveyance, wherein the brake device is provided with a brakeshoe movable at its upper end about a fixed bearing point and a lever linkage connected to the lower end thereof, the lever linkage having a manual operating handle and being formed as a toggle, such that the brakeshoe is maintained in either an operative or an inoperative position as the toggle is moved from one side to the other.

Figure 4:
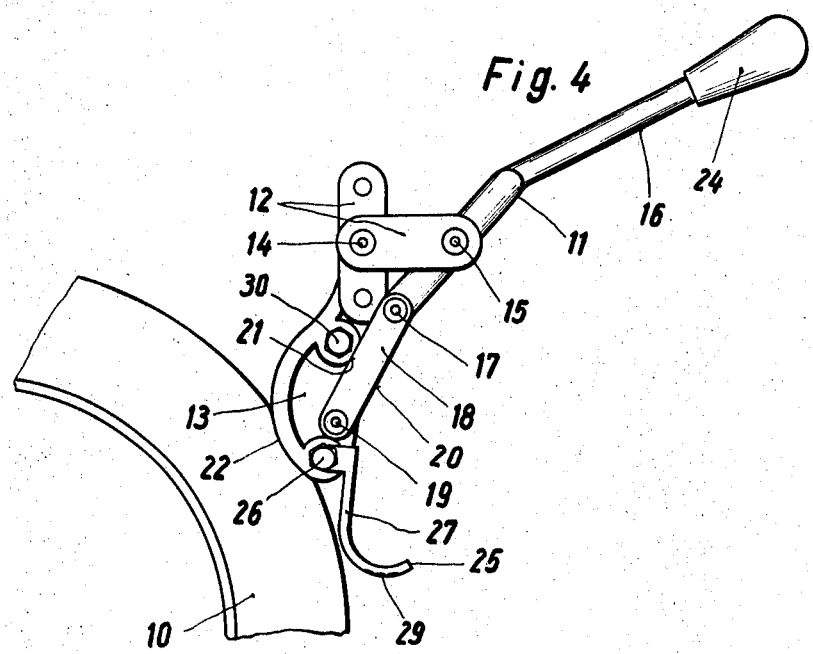
Figure 5:
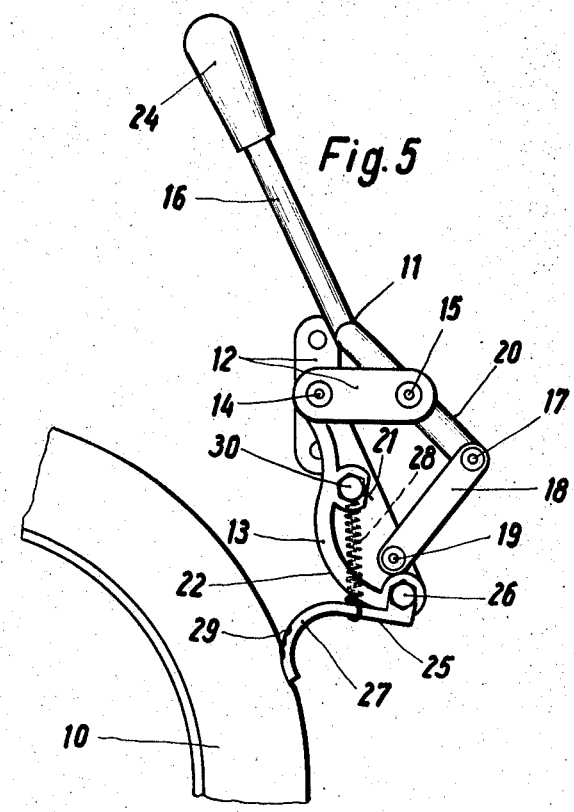

Embodiments of the invention are shown in the accompanying drawings, in which:

FIG. 1 shows a side view of a wheelchair having a brake device arranged in the region of its driving wheels, FIG. 2 is a side view from the left of the same brake device showing a brakeshoe pivotally mounted on a pedestal bearing and adapted to be displaceable by means of a lever linkage and a reverse lock connected on the underside, FIG. 3 is a side view from the right of the same brake device, FIG. 4 shows a side view of the same brake device showing the brakeshoe in the operating position, FIG. 5 is a side view of the same brake device showing the reverse lock in working position, and FIG. 6 is a side view of the same brake device with a modified reverse lock, the brake device being in the braking position and the reverse lock in the inoperative position.

From the drawings it will be seen that a wheelchair for handicapped persons is fitted at least on one side thereof but preferably on both sides, with a brake device 11 acting on a driving wheel 10, which brake device is mounted by means of a pedestal 12 on the wheelchair frame or the sidewall 10a of the wheelchair and provided so as to be displaceable towards or away from the driving wheel 10.

A brakeshoe 13 is mounted with its upper end pivoting about a bearing 14 on the pedestal 12, the pedestal being detachably mounted by means of screws or the like on the sidewalls 10a of the wheelchair.

A further bearing 15 is provided on the pedestal 12 about which a two-armed hand lever 16 is pivotally arranged; the two bearing points 14 and 15 form horizontal axes and are spaced apart on a common vertical plane. The hand lever 16 has its lower end hingedly connected with a connecting lever 18 at a pivot point 17; the other end of the connecting lever 18 is pivotally connected at 19 to the brakeshoe 13. The part of the hand lever 16 below the bearing point 15, and the connecting lever 18, form a three-point lever linkage 20 to which linkage the part of the hand lever 16 provided above the bearing point 15 is rigidly connected, or is adapted to be coupled thereto as an independent member.

The bearing points 14 and 15 together with the hinge points 17 and 19 form an inwardly hingeable quadrilateral hinge moved by the displaceable lever linkage 20. A limitation of the pivotal movement of the lever linkage 20 is provided by a stop 21 which is located on the brakeshoe 13.

The lever linkage 20 with the hand lever 16 serves to move the brakeshoe 13 into its working position, the brakeshoe 13 being urged towards the driving wheel 10 to be braked. The face 22 of the brakeshoe 13 nearest the driving wheel is curved, and may be fluted or serrated to make a gripping and reliable contact with the outer cover surface of the wheel 10.

To locate the brakeshoe 13 in its inoperative position a helical tension spring 23, is provided (see FIG. 3), which at one end engages the brakeshoe 13, its other end being attached to the pedestal 12, so that the brakeshoe 13 is normally retained with clearance from the wheel 10 to be braked. The part 16 of the hand lever 16 is cranked and provided at its end with a hand grip 24.

If movement of the wheelchair is to be reduced, or if the chair is to be immobilized, the handle 24 is moved forward so that the lever part provided below the bearing point 15 is moved towards the wheel 10 to be braked. This lower part forms a part of the lever linkage 20 which serves to move the brakeshoe 13 into its operating position. The hand lever part 20 moves the coupling lever 18, the hinge point 17 being positively guided along a pitch circle extending about the bearing point 15. The lower end region of the coupling lever 18 displaces the brakeshoe 13 about its bearing point 14 in a direction towards the wheel 10 to be braked. This movement of the lever linkage 20 occurs until lever part 20 abuts against the stop 21, which is the braking position. During this movement, however, the central hinge point 17 swings beyond the connecting line of the two outer hinge points 15, 19 of the lever linkage 20 (FIG. 4), i.e. the dead center position of the lever linkage 20, thus ensuring positive location of the brakeshoe 13 in the working position. This brake position cannot be accidentally automatically released, the brakeshoe 13 being held against the tyre by the toggle action of the linkage. When releasing the brake, the hand lever 16 is pulled back so that the hinge point 17 is moved from its stop position beyond the dead center and the tension spring 23 then pulls the brake device 11 back into its inoperative position.

The connecting link 18 is preferably double, i.e. a link member on each side of the part 20, so that both the hand lever 16 and the brakeshoe 13 are closely coupled. Furthermore the connecting lever 18, the hand lever 16 and/or the brakeshoe 13 may have bifurcated ends at the pivot points. The pedestal 12 may be provided with large guide surfaces at the bearing points 14, 15 for the hand lever 16 and the brakeshoe 13. The hand lever 16 may be formed as a double-armed lever to form a part of the lever linkage 20, or the hand lever 16 may be coupled at the hinge point 15 as a one-armed lever with the lever linkage 20. The hinge points may be formed from bolts, pins, screws or the like which extend horizontally, (see FIGS. 2—5).

At the lower end of the brakeshoe 13 there is a reverse lock 25 biased by a spring, the lock being hinged so as to move downwardly about a hinge point 26 in the direction of the wheel 10 to be braked. This reverse lock 25 is a curved brake or sliding body which is connected to the brakeshoe 13 by means of a bolt at its hinge point 26. The reverse lock 15 is retained in its inoperative position by a helical tension spring 28, the tension spring 28 extending between a point on the reverse brake and the stop 30. The fixing points of the tension spring 28 and the pivot of the reverse lock 25 form a toggle which locates the reverse lock 23 either in the inoperative position or the working position. The working surface 29 of the reverse lock 25 is roughened, fluted or serrated. In the inoperative position of the reverse lock 25 its tension spring 28 retains it at a certain clearance from the wheel 10.

When the chair is moved up an incline or steps, the reverse lock 25 is brought into its operating position, by rotating it about its hinge point 26 in the direction of the wheel 10 to be braked so that its working surface 29 abuts against the wheel tyre. When the wheelchair travels in a forward direction, the reverse lock 25 slides over the tyre surface and does not hinder the travel of the wheelchair. If the wheelchair attempts to roll backward due to incline of the track, the reverse lock 25 assumes its working position. Since the reverse lock 25 has its working surface 29 against the wheel 10, such a reversal force presses the reverse lock into the tyre and causes the wheel 10 to be locked (see FIG. 5).

The reverse lock 25 movement is limited by a stop which is formed by the brakeshoe 13 (brake surface 22), against which the reverse stop 25 is supported after a certain amount of reverse movement. This reverse lock 25 reliably prevents the wheelchair from rolling backwards, since due to friction it is immediately held against the tyre surface and locks the wheel 10 in question. The reverse lock 25 may be manually released either by moving it forward, or by applying the brake device 11, since then the reverse lock 25 is urged away from the wheel 10 and is pulled back into the inoperative position by means of its tension spring 28.

The brake device in accordance with the invention, with reverse lock, is distinguished by its simple structure, easy manipulation and reliable method of operation. By actuating the hand lever the brake device may rapidly be moved into its working position.

The brake device shown in FIG. 6 is a similar in basic structure to the brake device 11 as shown in FIGS. 2 to 5. The modification resides in an alternative design of the reverse stop 31, which is formed of a casting of arcuate cross section, being connected to the brakeshoe 13 at the hinge point 26 in the direction of the wheel 10 to be braked.

This reverse lock 31 is retained either in an inoperative position (see FIG. 6) or in braking position by means of a tension spring 28, which has one end located at the fixing point 30 on the brakeshoe 13 and the other end at a fixing point 32 on the reverse lock 31, forming a triangle with the hinge point 26 and the fixing point 30. The end of the arcuate reverse stop 31 opposite the hinge point 26 is formed as a roughened brake surface 33, and in the inoperative position of the reverse lock 31 is remote from the wheel 10. To obtain a brake action with the reverse lock 31, the latter is swiveled through about 180° about the hinge point 26 in the direction of the wheel 10, so that its brake surface 33 makes contact with the wheel 10. The mode of operation of this modified reverse lock 31 corresponds to that shown in FIGS. 2 to 5. This reverse lock 31 is simply and economically produced and is of stable design.

A brake of the invention, with or without reverse lock, may also be fitted to other vehicles such as perambulators, baby carriages, handcarts or the like.

I claim:

1. A braking and reverse locking device for wheelchairs including a pedestal bearing locatable on the wheelchair chassis, a brakeshoe pivotably mounted on said pedestal bearing, a toggle lever linkage pivotally connected at one end to said brakeshoe and at its other end connecting with a hand lever and being pivotally mounted on said pedestal bearing with said lever being operable to move the brakeshoe into a position of use and a position of nonuse, and with said toggle lever linkage for the braking position being adapted to be hinged with its central hinge point beyond the dead center in the direction of the wheel to be braked, and a reverse lock arm pivotally mounted on said brakeshoe and spring-biased into operative and inoperative positions whereby in said operative position said reverse lock arm is downwardly pivotal towards the wheel and adapted to be held in said position during the forward movement of the wheel against its surface while being adapted to be pressed into the wheel surface upon the reverse movement of the wheel to effect simultaneous automatic braking.

2. A braking device as claimed in claim 1 in which the pedestal bearing has two juxtaposed bearing points, one of which points serves as the mounting for said brakeshoe and the other as the mounting for said toggle lever linkage, the upper end of said brakeshoe being mounted on said pedestal bearing and the lower end of said brakeshoe being pivotally connected with said toggle lever linkage, and a tension spring located between bearing block and brakeshoe to urge and retain the latter in the inoperative position.

3. A braking device as claimed in claim 1 in which said reverse lock arm is pivotably mounted on the lower end of said brakeshoe, and a tension spring is connected at its one end in the region between this pivot point and the operating surface of said reverse lock arm and at its other end is connected to the brakeshoe in the region between its upper bearing point and the pivot point of the reverse lock arm, with the mounting points of the tension spring and the hinge point of the reverse lock located at the end points of a triangle.

4. A brake device as claimed in claim 1 in which said brakeshoe is provided with limit stops for said toggle lever linkage and said reverse lock arm.

5. A brake device as claimed in claim 1 in which the operating surfaces of said brakeshoe and said reverse lock arm are convex, and are provided with grooves within the arc formed by said surfaces.